United States Patent [19]

Robertson-McKenzie

[11] Patent Number: 5,113,527
[45] Date of Patent: May 19, 1992

[54] FIRE AND SMOKE PROTECTIVE HOOD

[75] Inventor: Noel Robertson-McKenzie, Tudor House, Castle Way, Hanworth, Middlesex TW13 7QG, England

[73] Assignee: Noel Robertson-McKenzie, Hanworth, England

[21] Appl. No.: 729,893

[22] Filed: Jul. 15, 1991

Related U.S. Application Data

[63] Continuation of Ser. No. 576,869, Sep. 4, 1990, abandoned, which is a continuation of Ser. No. 356,914, May 23, 1989, abandoned.

[51] Int. Cl.⁵ .................................................. A42B 3/00
[52] U.S. Cl. .................................................... 2/7; 2/8; 2/81; 428/263
[58] Field of Search .............................. 2/2, 5, 7, 8, 81; 66/202; 139/425 R; 428/245, 260, 262, 263, 285, 289, 921, 920, 272

[56] References Cited

U.S. PATENT DOCUMENTS

| 3,521,629 | 7/1970 | Reynolds | 128/142.7 |
| 3,849,802 | 11/1974 | Govaars | 2/81 |
| 3,922,182 | 11/1975 | Merrick | 148/32 |
| 4,154,235 | 5/1979 | Warncke | 128/142.7 |
| 4,221,216 | 9/1980 | Kranz | 128/201.23 |
| 4,296,170 | 10/1981 | Ohashi | 428/313 |
| 4,365,001 | 12/1982 | Meyer | 428/480 |
| 4,369,222 | 1/1983 | Hedrick | 428/216 |
| 4,627,431 | 12/1986 | Werjefelt | 128/201.25 |
| 4,637,383 | 1/1987 | Lopez | 128/201.25 |
| 4,683,880 | 8/1987 | Werjefelt | 128/201.28 |
| 4,746,565 | 5/1988 | Bafford | 428/251 |

FOREIGN PATENT DOCUMENTS

| 206301 | 1/1955 | Australia | 428/263 |
| 123662 | 10/1984 | European Pat. Off. | |
| 161828 | 11/1985 | European Pat. Off. | 428/263 |
| 1444159 | 9/1969 | Fed. Rep. of Germany | |
| 2021882 | 1/1971 | Fed. Rep. of Germany | |
| 2840020 | 3/1980 | Fed. Rep. of Germany | |
| 2904100 | 8/1980 | Fed. Rep. of Germany | |
| 3039779 | 7/1982 | Fed. Rep. of Germany | |
| 3237316 | 9/1984 | Fed. Rep. of Germany | |
| 2268540 | 5/1980 | France | |
| 5949502 | 9/1982 | Japan | |
| 2078259 | 4/1987 | Japan | 428/263 |
| 2184156 | 8/1987 | Japan | 66/202 |
| 3114744 | 5/1988 | Japan | 428/263 |
| 433083 | 8/1935 | United Kingdom | |
| 524313 | 8/1940 | United Kingdom | |
| 1152691 | 5/1969 | United Kingdom | |
| 2126256 | 3/1984 | United Kingdom | |
| 2129670 | 1/1986 | United Kingdom | |
| 2200224 | 7/1988 | United Kingdom | |
| 2202151 | 9/1988 | United Kingdom | |
| 8202665 | 8/1982 | World Int. Prop. O. | |

OTHER PUBLICATIONS

McFadden, "Protective Passenger Smoke Hood", *Aerospace Magazine*, Feb. 1968, pp. 177-180.

Primary Examiner—Werner H. Schroeder
Assistant Examiner—Diana L. Biefeld
Attorney, Agent, or Firm—Fleit, Jacobson, Cohn, Price, Holman & Stern

[57] ABSTRACT

A protective hood (1) for protecting an individual from the effects of fire and smoke in a fire related emergency comprises a high temperature resistant plastics material (14) having a layer of titanium (2, 15) on at least a part of its outer surface. Preferably the plastics material has a layer of fluoropolymer (3, 13) on its inner surface and the titanium is sufficiently thick to provide the required heat reflective properties, but is transparent to visible light.

23 Claims, 5 Drawing Sheets

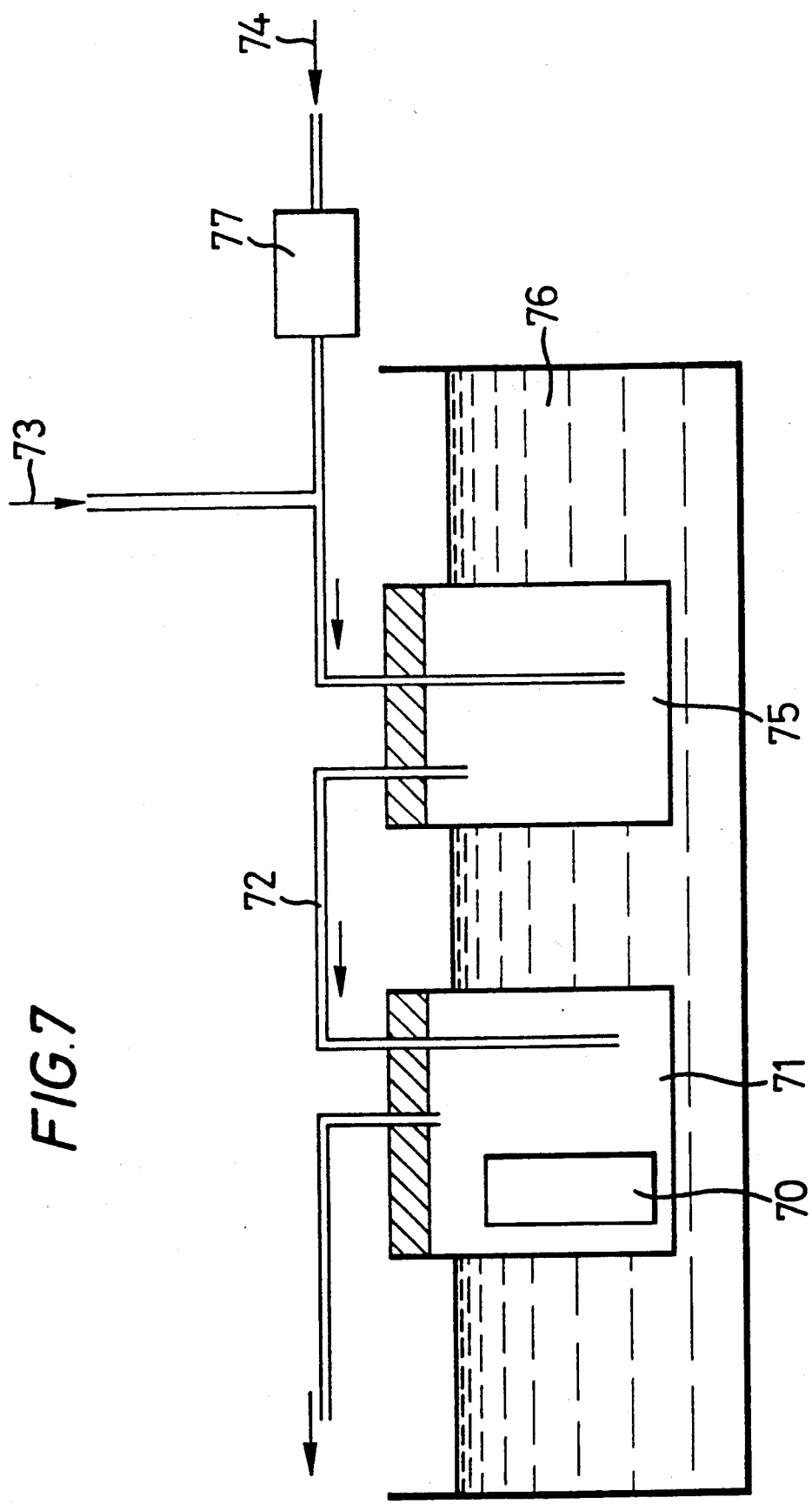

FIRE AND SMOKE PROTECTIVE HOOD

This is a continuation of application Ser. No. 07/576,869, filed Sept. 4, 1990, now abandoned, which in turn is a continuation of U.S. patent application Ser. No. 07/356,914 filed May 23, 1989, now abandoned.

This invention relates to protective hoods and in particular to a protective hood for protecting an individual from the effects of smoke and fire in a fire related emergency.

It is known to provide a protective hood in the form of a bag of heat resistant plastics material which may be used in the event of a fire related emergency to protect an individual from the effects of smoke and fire. Such protective hoods may be pulled over the head of the individual and provide a limited volume of clean, smoke-free air which may suffice to sustain the individual whilst they attempt to escape from the fire related emergency. Such hoods may suitably be used in fire related emergencies in confined spaces, such as hotels, factories, homes, vehicles, ships and aircraft. The limited amount of clean air may be provided by means of suitable filters or by compresses oxygen or air supplies to the hood.

However, such hoods tend to transmit and absorb heat from the fire so that the individual's head is not protected from the effects of heat, for example discomfort, burns and the like.

It is known to provide such hoods with a metal coating to reflect heat and reduce absorption. Such coatings may comprise a layer of gold, silver and aluminum. However, it has been found that some coatings tend to be dislodged from the heat resistant plastics material under the conditions to which they are exposed in a fire related emergency. Furthermore, some metals tend to be attacked by the noxious gases to which they are exposed in a fire related emergency and may become opaque.

BRIEF SUMMARY OF THE INVENTION

Thus according to the present invention there is provided a protective hood for protecting an individual from the effects of smoke and fire in a fire related emergency, comprising a high temperature resistant plastics material having a layer of titanium on at least a part of its outer surface.

Preferably, the plastics material is a thermoset plastics material such as polyimide, for example Upilex (trademark) or Kapton (trademark). Preferably, at least a part of the plastics material is transparent to visible radiation.

Preferably, the hood has a layer of fluoropolymer on at least a part of its inner surface. The fluoropolymer may be fluoroethylene polymer (FEP) or perfluoroalkoxy polymer (PFA).

The fluoropolymer may be in the form of a layer 10 to 40 micrometers thick. The plastics material may be in the form of a film 25 to 75 micrometers thick.

The layer of titanium is preferably sufficiently thick to provide the required reflection and transmission properties for heat, but if the hood is used to cover the eyes of the individual, the layer of titanium which covers the eyes must still be sufficiently transparent to visible radiation to provide sufficient visibility for the individual. This may be achieved by using a layer of titanium of different thicknesses at different parts of the hood. The titanium may be a layer several hundred angstroms thick, that is between 100 and 1000 angstroms thick. The titanium may be between 50 and 200 mg per square meter of hood material, preferably between 100 and 150 mg per square meter. The titanium may be applied by sputtering. The hood material may have a transmittance for electromagnetic radiation of between 10% and 40%, preferably between 15 and 25% at 620 nanometers. Preferably, the hood material has about a 70% rejection of infra red radiation.

The present invention may also be used in the form of a cloak or other garment which may be placed over part or all of the body of the individual.

The present invention may be used in the form of a visor on a protective mask or in the form of shield which may be used in a fire related emergency.

Also according to the present invention there is provided an emergency breathing apparatus comprising a hood as hereinbefore described and having suitable filters or a breathable gas supply to provide a wearer of the hood with a limited volume of clean, smoke-free breathable gas which may suffice to sustain the individual whilst they attempt to escape from the fire related emergency. The breathable gas supply may be an independent compressed oxygen-containing gas supply.

According to the present invention there is also provided a method of protecting an individual from the effects of smoke and fire in a fire related emergency comprising placing a protective hood over a part or all of the body of the individual, the hood comprising a high temperature resistant plastics material having a layer of titanium on at least a part of its outer surface.

BRIEF DESCRIPTION OF THE DRAWINGS

The invention will now be described by way of example only with reference to the accompanying drawings wherein

FIG. 2 is an enlarged cross-sectional view of a seam, part of a protective hood according to the present invention;

FIG. 7 is a cross-sectional schematic view of the apparatus used to test the chemical resistance of material used to fabricate protective hoods according to the present invention.

DETAILED DESCRIPTION

Figure 1:
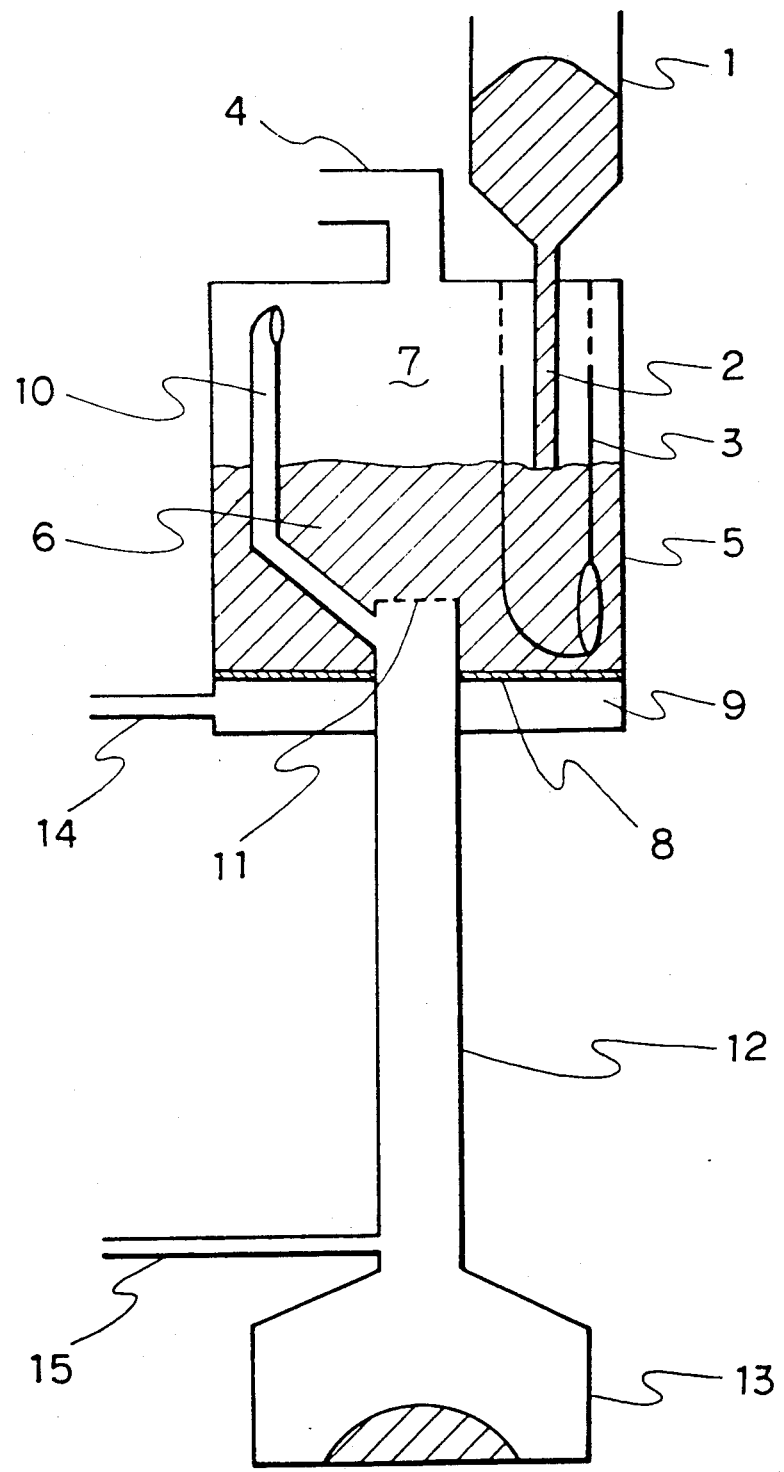
FIG. 1 is a perspective view which represents a protective hood according to the present invention.

In FIG. 1, a protective hood 1 according to the present invention comprises Kapton having a layer of titanium on its outer surface 2 and a layer of fluoropolymer on its inner surface 3. The hood has a suitable neck seal 4 which allows the hood to be pulled over the head of an individual (not shown) in a fire related emergency and forms a seal with the neck (not shown) to prevent the ingress of smoke and fumes. The hood is fabricated by joining suitably shaped pieces of Kapton film at suitable seams 5 by heat and pressure welding. The hood is provided with filters 6 to allow the individual to breath clean, smoke-free air for a limited period whilst wearing the hood.

In FIG. 2 part of a hood 1 according to the present invention is shown in cross-section with an inner surface 3 adjacent to the head of an individual (not shown) and an outer surface 2 adjacent to a source of heat or fire (not shown). The hood 1 comprises three layers, an inner layer of fluoroethylene polymer 13, 25 micrometers thick, a layer of Kapton film 14, 50 micrometers thick and an outer layer of sputtered titanium 15 several hundred angstroms thick. FIG. 2 also shows a seam 5 of two pieces of the Kapton joined to form the hood so that the inner (fluoroethylene polymer) layers 13 are bonded together to provide a gas-tight seal.

Figure 3:
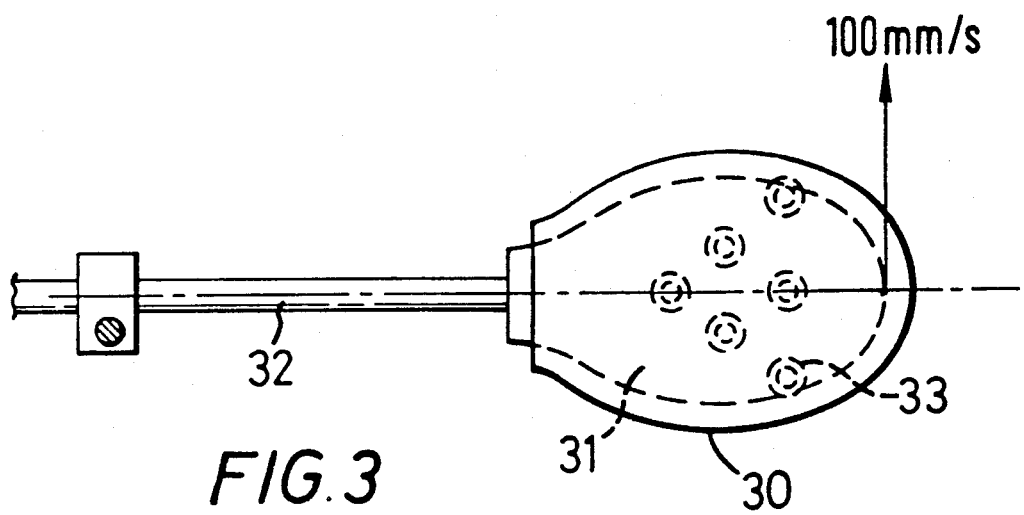
FIG. 3 is a top plan view of the apparatus used for testing the flame resistance of a protective hood according to the present invention.
Figure 4:
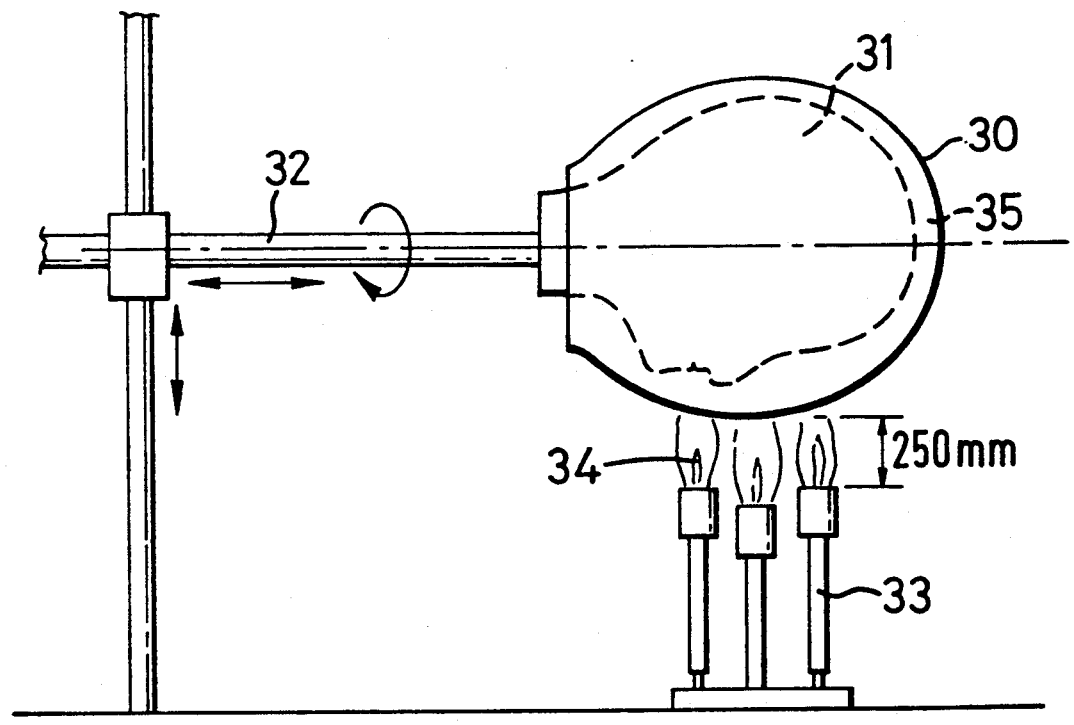
FIG. 4 is a side elevational view of the apparatus shown in FIG. 3.

Prototype hoods without filters fabricated from material comprising fluoroethylene polymer, 25 micrometers thick; Kapton, 50 micrometers thick and titanium were subjected to a flame exposure test. The titanium was sputtered onto and Kapton by a DC magnetron sputtering process with argon partial pressure. The amount of titanium on the Kapton was measured by standard wet ashing analysis to be 116 milligrams of titanium per square meter which by calculation, is believed to be equivalent to a thickness of about 255 angstroms. FIGS. 3 and 4 show the apparatus used for the flame exposure test. A hood 30 according to the example was supported on a metal head-shaped holder 31 called a Sheffield head. The hood 30 contained air 35. The Sheffield head 31 was held on a support 32 which was adjustable. Six burners 33 were used to produce a large diffuse propane flame 34 using a propane supply of 13 liters (NTP) per minute at 0.25 barg. These burners 33 produced a flame 34 with a temperature maximum of 915° C. to 920° C. The smoke hood 30 was positioned 250 mm above the burners. The burners 33 had adjustable height for this purpose. The hood 30 was passed through the flame 34 from the burners 33 at a traverse rate of 100 mm/s giving a flame contact time of 5 to 6 seconds. The heat flux in the flame was about 40 Kw/m$^2$. The main areas of the hoods and the seams were exposed in separate tests by changing the position of the hood 30 on the Sheffield head 31. A limited number of more severe tests were undertaken by passing the hood more than once through the flame and by using a larger flame.

The titanium coated Kapton FEP of the hood showed no significant effect of the flame 34 after a number (up to three) passes through the flame. Some particulate matter (soot) was deposited on the surface but was easily wiped off. There was no obvious attenuation in the transparency of the hood material, in fact the material appeared more transparent after the flame tests.

The seams of the hood withstood contact with the flame 34 when the hood 30 was passed once through the flame in both horizontal and vertical orientation, i.e. seam facing down towards the flame 34. In view of this lack of damage, a limited number of more severe tests were carried out in which a hood was passed repeatedly through the flame. The hood resisted a single pass and also a second pass, 2 minutes after the first, and the seam only started to fail after a third pass. A limited number of tests were also undertaken with a larger propane flame (propane supply at 1.25 bar and 27 liters (NTP)/minute). The hood resisted two passes through the larger flame and the seam only started to fail in areas of high stress (hoods were a tight fit on the Sheffield head) during the third pass.

Figure 5:
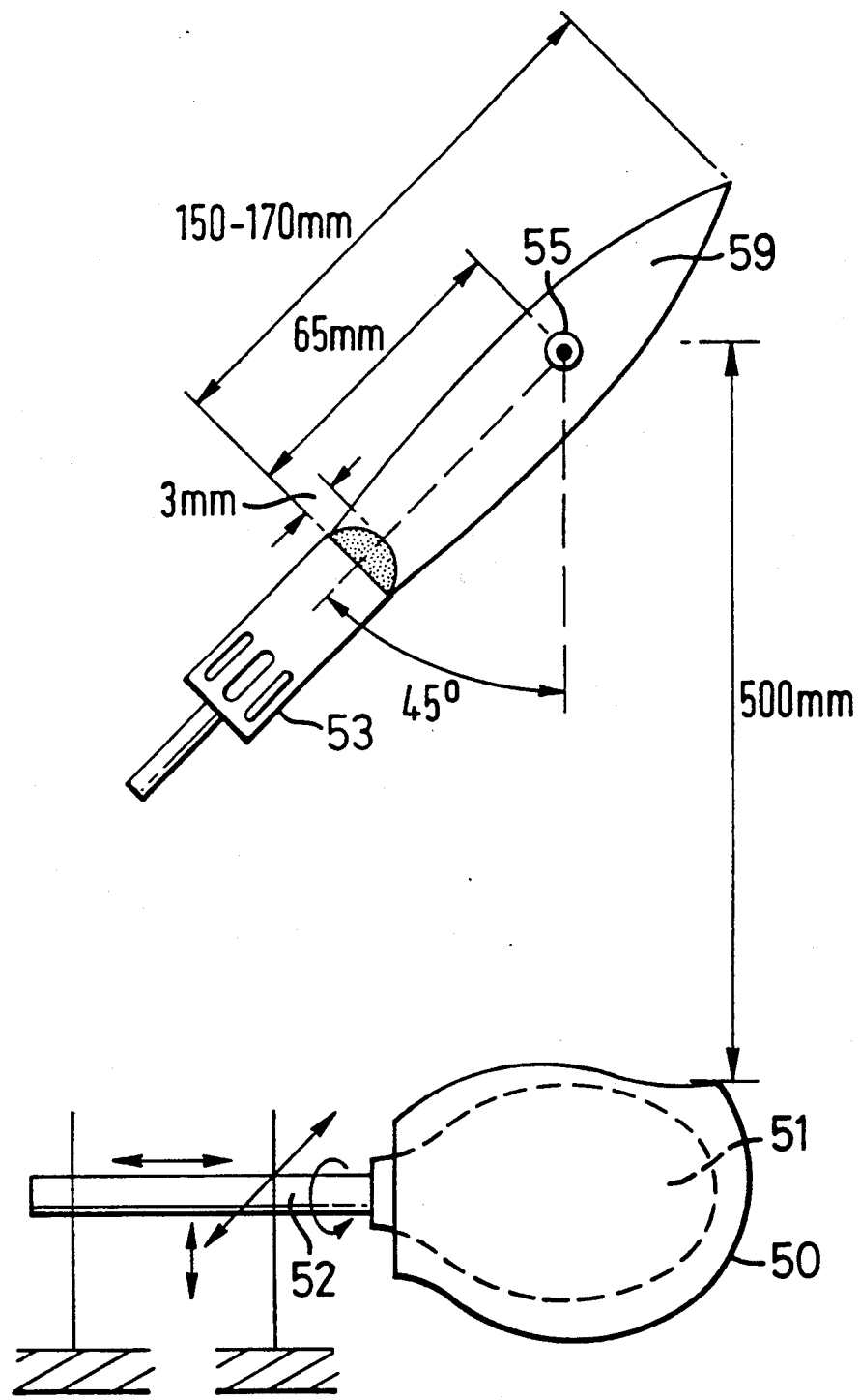
FIG. 5 is a side elevational view of the apparatus used for testing the resistance to molten drops of nylon on a protective hood according to the present invention.
Figure 6:
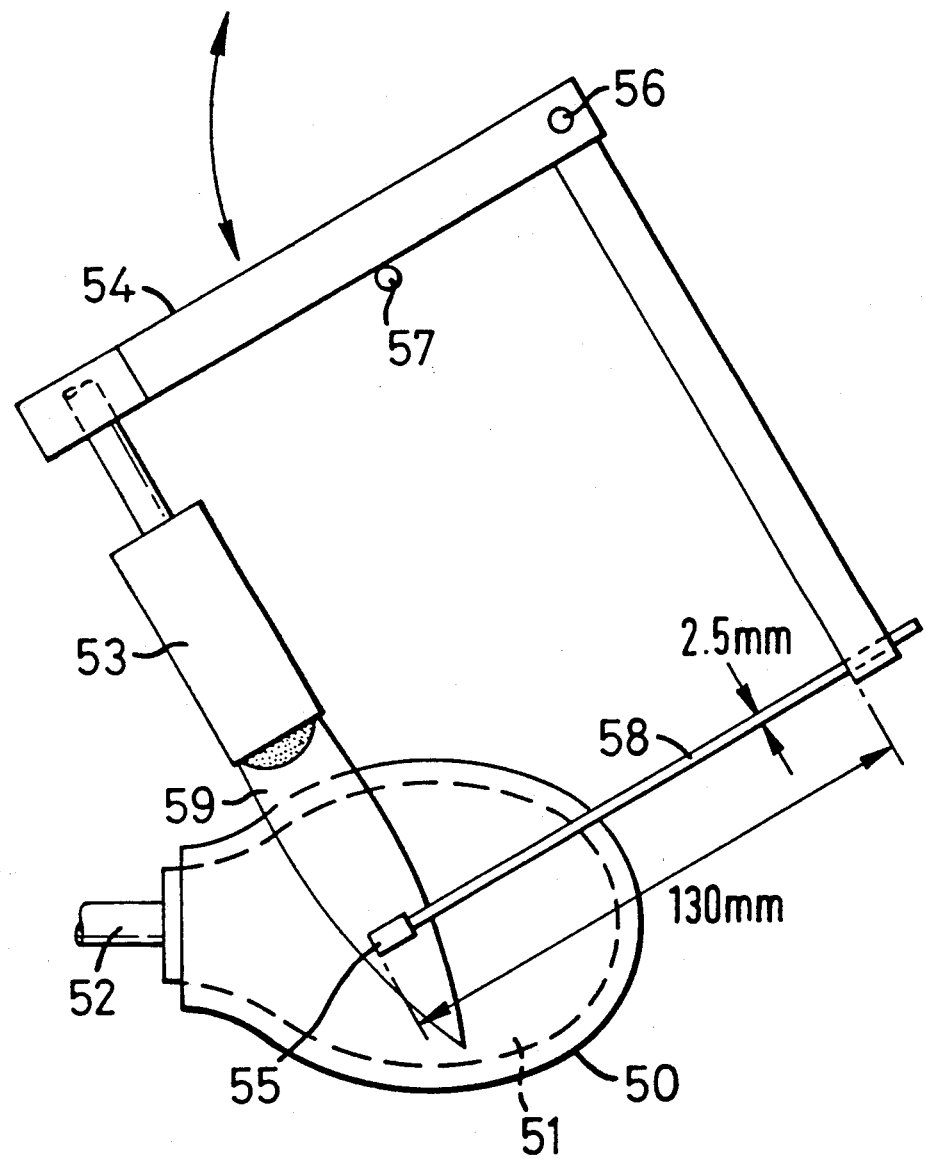
FIG. 6 is a top plan view of the apparatus shown in FIG. 5.

Prototype hoods without filters fabricated from material comprising FEP, 25 micrometers thick; Kapton, 50 micrometers thick and titanium, 116 milligrams per square meter were also subjected to molten drop tests. FIGS. 5 and 6 show the apparatus used for this test. A hood 50 according to the example was supported on a rubber head-shaped holder 51 called a Sheffield head. The Sheffield head 51 was held on a support 52 which was adjustable. A gas burner 53 on a swivel mounting 54 was mounted above the hood 50. The gas burner produced a flame 59 150–170 mm long with a temperature of about 1050° C. using commercial grade propane gas at 1 bars, 1.2 liters (NTF) per minute. A piece of nylon 11 tubing 55 was held on a support 58 500 mm above the hood 50. The swivel mounting 54 was pivotable about a pivot 56 and a stop 57 prevented the burner from being moved closer than 65 mm to the nylon tubing 55. The nylon 11 tube 55 had a length of 10 mm, an outside diameter of 2.5 mm, internal diameter of 1.7 mm, a melting point of 170° C. and contained 11% butylbenzene sulphonamide plasticizer. It also had a Melt Flow Index at 230° C., 2.16 Kg of 11 g/10 min, and Melt Flow Index at 190° C., 2.16 Kg of 1.8 g/10 min.

During the test, the burner 53 produced a flame 59 which melted the nylon tube 55 and caused burning drops of nylon to fall onto the hood 51. The drops typically burned for about 4 to 8 seconds. Both the main area of the hood and the seams were tested separately. The tests showed that the drops burned for several seconds before extinguishing without causing an damage to the hood material. The hoods were not significantly distorted or penetrated by the molten drops. When cool the drops were easily removed from the hood leaving an undamaged surface.

Samples of titanium coated plastics materials were evaluated for resistance to various noxious gases which might be expected to be present in the atmosphere of a fire related emergency. For comparison, samples of stainless steel coated polyester were also assessed. The effects of the various chemicals were assessed visually and by the effect on optical properties (% transmittance of different incident electromagnetic radiation wavelengths using a Perkin Elmer Lambda 9 UV/VIS/NIR Spectrometer). The apparatus used for exposing the samples to the noxious gas is shown schematically in FIG. 7. The samples 70 of material were placed in a polypropylene exposure vessel 71 through which a stream of gas 72 was passed. The gas 72 comprised a mixture of concentrated noxious gas 73 and air 74 which were premixed and preheated in a preheating vessel 75. Both the preheating vessel 75 and the exposure vessel 71 were kept at a constant temperature (100° C.) in a thermostatically controlled water bath 76.

The samples 70 were exposed for 30 minutes at 100° C. to humid and dry test atmospheres separately. Humid conditions were obtained by passing the air through a water-filled Drechsel bottle 77 fitted with a mist trap and corresponded to approximately 90% relative humidity. Dry conditions were obtained by replacing the Drechsel bottle with a drying tower and passing the air through the drying tower which contained, for example, phosphorous pentoxide and corresponded to less than 5% relative humidity.

The samples 70 were exposed to test atmospheres on one face only (the metal coated side where applicable) the rear face being protected from exposure by taping the samples onto a sheet of PTFE (now shown).

The following noxious gases were used separately, all at 1000 vapor parts per million: hydrogen chloride, hydrogen cyanide, hydrogen fluoride, ammonia, nitrogen dioxide, and sulphur dioxide. The samples were also exposed to all these gases sequentially in the order given in the tables. The results are tabulated in Tables 1 to 11.

Tables 1 and 2 show comparative results for stainless steel coated polyester. Tables 3 and 4 show results for titanium coated polyester. The stainless steel and titanium were sputtered onto the polyester by a DC magnetron sputtering process with argon partial pressure. The polyester was 142 gauge. Table 5 shows the results for the same material as was used for the flame tests, that is FEP 25 micrometers thick. Kapton 50 micrometers thick and 116 milligrams of titanium per square meter. This sample had a transmittance of 19% at 620 mm and a similar sample had a transmittance of 21% of 620 mm, measured using the Lambda 9 spectrometer. Tables 6 to 11 inclusive show results for various titanium coated Kapton/FEP samples with ammonia and hydrogen fluoride. The thickness of the titanium for the samples in Tables 6 to 11 was measured on-line by an optical monitor within the sputtering machine at 620 nanometer wavelength and is referred to as %T which is the percentage of energy transmitted at 620 nanometers.

The stainless steel coated materials were affected only by hydrogen fluoride and hydrogen chloride. The film damage was only just discernable visually but the transmittance properties in Tables 1 and 2 show an increase in transmittance indicative of attack of the stainless steel.

Titanium coated polyester showed no damage from any of the gases except hydrogen fluoride. Some very slight visual damage was discernable with hydrogen fluoride and the results in Tables 3 and 4 show an increase in transmittance after exposure to hydrogen fluoride, indicative of attack. Whilst these results show the chemical resistance of titanium, polyester would not be a suitable plastics material according to the present invention.

Titanium coated Kapton/FEP showed no visible sign of attack by any of the gases but the transmittance properties shown in Table 5 show that there was slight attack by hydrogen fluoride, resulting in a very small increase in transmittance.

Similar results are shown in Tables 6 to 11 which show that hydrogen fluoride caused slight metallic layer damage to the titanium coated Kapton/FEP but ammonia did not.

The examples given show that the protective hood according to the present invention exhibits good resistance to the conditions which may be present in a fire related emergency, that is, good flame resistance, good resistance to molten, burning plastics material and good resistance to noxious gases.

TABLE 1

EXPOSURE OF STAINLESS STEEL COATED POLYESTER TO NOXIOUS GASES

| Gas | % Transmittance of electromagnetic radiation at wavelength | | |
|---|---|---|---|
| | 600 nm | 1200 nm | 2000 nm |
| None | 47 | 51 | 51 |
| Hydrogen chloride (humid) | 51 | 57 | 57 |
| Hydrogen fluoride (humid) | 47 | 50 | 54 |
| Sulphur dioxide (humid) | 47 | 51 | 51 |
| Nitrogen dioxide (humid) | 47 | 53 | 54 |
| Hydrogen cyanide (humid) | 48 | 50 | 53 |
| All gases sequentially (humid) | 57 | 60 | 60 |

TABLE 2

EXPOSURE OF STAINLESS STEEL COATED POLYESTER TO NOXIOUS GASES

| Gas | % Transmittance of electromagnetic radiation at wavelength | | |
|---|---|---|---|
| | 600 nm | 1200 nm | 2000 nm |
| None | 29 | 31 | 32 |
| Hydrogen chloride (humid) | 35 | 35 | 36 |
| Hydrogen fluoride (humid) | 35 | 35 | 35 |
| Sulphur dioxide (humid) | 30 | 30 | 33 |
| Nitrogen dioxide (humid) | 31 | 32 | 35 |
| Hydrogen cyanide (humid) | 31 | 30 | 36 |
| All gases sequentially (humid) | 37 | 38 | 37 |

TABLE 3

EXPOSURE OF TITANIUM COATED POLYESTER TO NOXIOUS GASES

| Gas | % Transmittance of electromagnetic radiation at wavelength | | |
|---|---|---|---|
| | 600 nm | 1200 nm | 2000 nm |
| None | 47 | 49 | 49 |
| Hydrogen chloride (humid) | 49 | 47 | 48 |
| Hydrogen fluoride (humid) | 59 | 58 | 59 |
| Sulphur dioxide (humid) | 49 | 47 | 49 |
| Nitrogen dioxide (humid) | 50 | 47 | 50 |
| Hydrogen cyanide (humid) | 50 | 47 | 48 |
| All gases sequentially (humid) | 64 | 61 | 63 |

TABLE 4

EXPOSURE OF TITANIUM COATED POLYESTER TO NOXIOUS GASES

| Gas | % Transmittance of electromagnetic radiation at wavelength | | |
|---|---|---|---|
| | 600 nm | 1200 nm | 2000 nm |
| None | 30 | 30 | 32 |
| Hydrogen chloride (humid) | 30 | 29 | 32 |
| Hydrogen fluoride (humid) | 35 | 35 | 37 |
| Sulphur dioxide (humid) | 30 | 30 | 30 |
| Nitrogen dioxide (humid) | 31 | 30 | 31 |
| Hydrogen cyanide (humid) | 30 | 29 | 29 |
| All gases sequentially (humid) | 39 | 36 | 37 |

TABLE 5

EXPOSURE OF TITANIUM COATED KAPTON/FEP TO NOXIOUS GASES

| Gas | % Transmittance of electromagnetic radiation at wavelength | | |
|---|---|---|---|
| | 600 nm | 1200 nm | 2000 nm |
| None | 19 | 23 | 23 |
| Hydrogen chloride (humid) | 19 | 22 | 23 |
| Hydrogen chloride (dry) | 19 | 22 | 25 |
| Hydrogen fluoride (humid) | 22 | 26 | 28 |
| Hydrogen fluoride (dry) | 20 | 23 | 26 |
| Sulphur dioxide (humid) | 19 | 22 | 25 |
| Sulphur dioxide (dry) | 19 | 23 | 24 |
| Nitrogen dioxide (humid) | 20 | 24 | 26 |
| Nitrogen dioxide (dry) | 20 | 24 | 25 |
| Hydrogen cyanide (humid) | 19 | 23 | 24 |
| Hydrogen cyanide (dry) | 19 | 22 | 23 |

TABLE 5-continued

EXPOSURE OF TITANIUM COATED KAPTON/FEP TO NOXIOUS GASES

| Gas | % Transmittance of electromagnetic radiation at wavelength | | |
|---|---|---|---|
| | 600 nm | 1200 nm | 2000 nm |
| Ammonia (humid) | 19 | 22 | 23 |
| Ammonia (dry) | 19 | 23 | 25 |
| All gases sequentially (humid) | 21 | 25 | 25 |

TABLE 6

EXPOSURE OF TITANIUM COATED KAPTON/FEP (43.6% T) TO NOXIOUS GASES

| Gas | % Transmittance of electromagnetic radiation at wavelength | | |
|---|---|---|---|
| | 600 nm | 1200 nm | 2000 nm |
| None | 29 | 28 | 34 |
| Hydrogen fluoride (humid) | 30 | 29 | 34 |
| Ammonia (humid) | 22 | 24 | 28 |
| Sequentially exposed to both gases (humid) | 28 | 26 | 29 |

TABLE 7

EXPOSURE OF TITANIUM COATED KAPTON/FEP (47.8% T) TO NOXIOUS GASES

| Gas | % Transmittance of electromagnetic radiation at wavelength | | |
|---|---|---|---|
| | 600 nm | 1200 nm | 2000 nm |
| None | 36 | 35 | 41 |
| Hydrogen fluoride (humid) | 38 | 34 | 38 |
| Ammonia (humid) | 37 | 35 | 39 |
| Sequentially exposed to both gases (humid) | 38 | 35 | 40 |

TABLE 8

EXPOSURE OF TITANIUM COATED KAPTON/FEP (70.7% T) TO NOXIOUS GASES

| Gas | % Transmittance of electromagnetic radiation at wavelength | | |
|---|---|---|---|
| | 600 nm | 1200 nm | 2000 nm |
| None | 50 | 52 | 60 |
| Hydrogen fluoride (humid) | 58 | 64 | 70 |
| Ammonia (humid) | 49 | 51 | 58 |
| Sequentially exposed to both gases (humid) | 57 | 62 | 68 |

TABLE 9

EXPOSURE OF TITANIUM COATED KAPTON/FEP (34.7% T) TO NOXIOUS GASES

| Gas | % Transmittance of electromagnetic radiation at wavelength | | |
|---|---|---|---|
| | 600 nm | 1200 nm | 2000 nm |
| None | 19 | 20 | 22 |
| Hydrogen fluoride (humid) | 25 | 25 | 26 |
| Ammonia (humid) | 22 | 22 | 26 |
| Sequentially exposed to both gases (humid) | 32 | 32 | 35 |

TABLE 10

EXPOSURE OF TITANIUM COATED KAPTON/FEP (15.1% T) TO NOXIOUS GASES

| Gas | % Transmittance of electromagnetic radiation at wavelength | | |
|---|---|---|---|
| | 600 nm | 1200 nm | 2000 nm |
| None | 9 | 10 | 13 |
| Hydrogen fluoride (humid) | 14 | 14 | 16 |
| Ammonia (humid) | 8 | 9 | 12 |
| Sequentially exposed to both gases (humid) | 14 | 13 | 16 |

TABLE 11

EXPOSURE OF TITANIUM COATED KAPTON/FEP (13.5% T) TO NOXIOUS GASES

| Gas | % Transmittance of electromagnetic radiation at wavelength | | |
|---|---|---|---|
| | 600 nm | 1200 nm | 2000 nm |
| None | 7 | 9 | 11 |
| Hydrogen fluoride (humid) | 12 | 12 | 15 |
| Ammonia (humid) | 9 | 10 | 13 |
| Sequentially exposed to both gases (humid) | 12 | 12 | 14 |

I claim:

1. A protective hood for protecting an individual from the effects of smoke and fire in a fire related emergency, comprising:
   a high temperature resistance flexible plastics material having an outer surface; and
   a layer of titanium on at least a part of said outer surface.

2. A protective hood as claimed in claim 1 wherein said layer of titanium is from 100 to 100 angstroms thick.

3. A protective hood as claimed in claim 1 wherein said layer of titanium comprises between 50 and 250 milligrams of titanium per square meter of said plastics material.

4. A protective hood as claimed in claim 3 wherein said layer of titanium comprises between 100 and 150 milligrams of titanium per square meter of said plastics material.

5. A protective hood as claimed in claim 1 having a transmittance of electromagnetic radiation at a wavelength of 620 nm between 10 and 40%.

6. A protective hood as claimed in claim 5 wherein said transmittance of electromagnetic radiation is between 15 and 25%.

7. A protective hood as claimed in claim 1 having a 70% rejection of infra red radiation.

8. A protective hood as claimed in claim 1 wherein at least a part of said layer of titanium is transparent to visible radiation.

9. A protective hood as claimed in claim 1 wherein said layer of titanium has been applied by sputtering.

10. A protective hood as claimed in claim 1 wherein:
    said hood has in inner surface; and
    a layer of fluoropolymer is provided on at least a part of said inner surface.

11. A protective hood as claimed in claim 10 wherein said fluoropolymer is fluoroethylene polymer.

12. A protective hood as claimed in claim 10 wherein said fluoropolymer is perfluoroalkoxy polymer.

13. A protective hood as claimed in claim 10 wherein said layer of fluoropolymer has a thickness in the range from 10 to 40 micrometers.

14. A protective hood as claimed in claim 1 wherein said high temperature resistant plastics material comprises a thermoset plastics material.

15. A protective hood as claimed in claim 14 wherein said thermoset material comprises polyimide.

16. A protective hood as claimed in claim 1 wherein said plastics material has a thickness in the range from 25 to 75 micrometers.

17. A protective hood as claimed in claim 1 wherein:
said plastics material comprises a high temperature polymer;
a seam is provided on said hood;
said hood has an inner surface; and
at least part of said inner surface has a layer of weldable polymer thereon at said seam.

18. An emergency breathing apparatus comprising in combination
a protective hood,
said hood comprising a high temperature resistant flexible plastics material having an outer surface, and
said hood having a layer of titanium on at least a part of said outer surface; and
means for supplying breathable gas to a wearer of said hood.

19. An emergency breathing apparatus as claimed in claim 18 wherein said means for providing breathable gas comprises at least one filter.

20. An emergency breathing apparatus as claimed in claim 19 wherein:
said plastics material has an inner surface; and
a layer of fluoropolymer is provided on at least a part of said inner surface.

21. An emergency breathing apparatus as claimed in claim 18 wherein:
said plastics material has an inner surface; and
a layer of fluoropolymer is provided on at least a part of said inner surface.

22. A protective garment adapted to enclose at least a part of a wearer's body, said garment comprising:
a high temperature resistant flexible plastics material having an outer surface; and
a layer of titanium on at least a part of said outer surface.

23. A protective shield comprising:
a high temperature resistant flexible plastics material having an outer surface; and
a layer of titanium on at least a part of said outer surface.

* * * * *